(12) United States Patent
Ikeda

(10) Patent No.: US 6,948,394 B2
(45) Date of Patent: Sep. 27, 2005

(54) TRANSMISSION

(75) Inventor: Tadashi Ikeda, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 19 days.

(21) Appl. No.: 10/666,378

(22) Filed: Sep. 18, 2003

(65) Prior Publication Data

US 2004/0055403 A1 Mar. 25, 2004

(30) Foreign Application Priority Data

Sep. 20, 2002 (JP) .......................... 2002-274759

(51) Int. Cl.⁷ ............................. F16H 3/08; B60K 41/26
(52) U.S. Cl. ......................... 74/331; 74/333; 192/220.2
(58) Field of Search .............................. 192/216, 220.1, 192/220.2, 221, 221.1; 74/331, 333, 335

(56) References Cited

U.S. PATENT DOCUMENTS

| | | | |
|---|---|---|---|
| 1,557,575 A | | 10/1925 | Ford |
| 2,550,545 A | * | 4/1951 | Findley ..................... 192/3.63 |
| 4,194,410 A | * | 3/1980 | Richards ..................... 74/339 |
| 4,211,313 A | * | 7/1980 | Quick et al. ................ 192/221 |
| 4,676,115 A | * | 6/1987 | Morscheck et al. ........... 74/339 |
| 5,946,971 A | | 9/1999 | Toyota et al. ................. 74/331 |

FOREIGN PATENT DOCUMENTS

| | | | |
|---|---|---|---|
| DE | 198 26 068 A1 | 12/1999 | |
| FR | 1 122 892 | 9/1956 | |
| FR | 1 136 254 | 5/1957 | |
| JP | 03-103664 | * 4/1991 | ................. 74/335 |
| JP | 2001263472 | 9/2001 | |
| JP | 2001-263472 | 9/2001 | |
| WO | WO 91/08407 | 6/1991 | |
| WO | WO 91/10079 | 7/1991 | |

OTHER PUBLICATIONS

Copy of European Search Report for Serial No. EP 03 02 0891 dated Aug. 12, 2004.

* cited by examiner

Primary Examiner—Ha Ho
(74) Attorney, Agent, or Firm—McCormick, Paulding & Huber LLP

(57) ABSTRACT

A transmission includes an input shaft, an output shaft, a first layshaft disposed parallel to the input shaft and the output shaft, a speed reduction gear connected between the output shaft and the first layshaft in a constant-mesh manner, and a plurality of transmission gear pairs provided between the input shaft and the first layshaft or output shaft to mutually engage and to transmit the rotational force of the input shaft to the output shaft, wherein the transmission further includes an input gear fixedly attached to the input shaft, a second layshaft disposed parallel to the input shaft, a second layshaft gear that engages the input gear and is disposed on the second layshaft, and a braking mechanism for braking the input shaft by braking the second layshaft gear.

15 Claims, 4 Drawing Sheets

TRANSMISSION

CROSS REFERENCE TO RELATED APPLICATION

This application claims priority from Japanese Patent Application No. 2002-274759 filed Sep. 20, 2002 in Japan, the disclosure of which incorporated herein by reference.

BACKGROUND OF THE INVENTION

1. Field of the Invention

The present invention relates to a transmission that ensures synchronization of the rotational speed of the shaft and the rotational speed of a gear during shifting gears by reducing the rotational speed of the shaft.

2. Description of the Related Art

In an automatic transmission mechanism that uses a conventional manual transmission, synchronization of the rotational speed of the shaft and the rotational speed of a gear during speed reduction is performed by increasing the rotational speed of the shaft through revving by engine control, and the synchronization of the rotational speed of the shaft and the rotational speed of a gear during speed increase is performed by reducing the rotational speed of a shaft (input shaft) 51 by means of a braking mechanism 53 disposed on a countershaft (layshaft) 52 arranged in parallel with the input shaft 51, as shown in FIG. 3 (Refer to Japanese Patent Application Laid-open No. 2001-263472, for example).

This transmission 54 is an input reduction type transmission in which a speed reduction gear 55 is provided between the input shaft 51 and the layshaft 52 in a constant mesh manner, comprising a transmission gear pair composed of a plurality of layshaft gears 56 provided to a layshaft 52 and a plurality of output shaft gears 58 provided to an output shaft 57.

However, in addition to the input reduction type transmission described above, there are also output reduction type transmissions in which a speed reduction gear is provided between the output shaft and the layshaft in a constant mesh manner, comprising a transmission gear pair composed of a plurality of input shaft gears provided to an input shaft and a plurality of layshaft gears provided to a layshaft.

In the output reduction type transmission 59, the output shaft 69 and the layshaft 68 are connected so as to be constantly engaged, as shown in FIG. 4, so a braking mechanism cannot be provided to the layshaft 68 because the rotational force of the layshaft 68 is directly transmitted to the output shaft 69, in other words, the propeller shaft.

As a result, a mechanical synchromesh 65, in which conical surfaces 63 and 64 for coupling that mutually make contact during gear insertion are respectively formed on each coupling surface of a gear 61 and a hub 62, has been adopted.

However, this mechanical synchromesh 65 slides both conical surfaces 63 and 64 for coupling to synchronize the rotational speed, so a drawback exists in that the device is larger and costs are higher due to the greater number of components that require working for the gear 61 and hub 62. Furthermore, if the vehicle is a large vehicle, then application is difficult because the force applied to the mechanical synchromesh 65 is greater.

SUMMARY OF THE INVENTION

In view of the above, the present invention is proposed with the aim of solving the above-stated problems, and an object thereof is to provide a transmission which enables to lighten the gear operation without increasing the size or costs of the transmission even if the transmission is of an output reduction type.

In order to achieve the above-stated object, the invention of the claim 1 is a transmission comprising: an input shaft for inputting drive force from an engine; an output shaft disposed concentrically with the input shaft so as to be capable of relative rotation with respect to the input shaft; a first layshaft disposed parallel to the input shaft and the output shaft; a speed reduction gear connected between the output shaft and the first layshaft in a constant-mesh manner; and a plurality of transmission gear pairs provided between the input shaft and the first layshaft or output shaft to mutually engage and to transmit the rotational force of the input shaft to the output shaft, wherein the transmission further comprises: an input gear fixedly attached to the input shaft; a second layshaft disposed parallel to the input shaft; a second layshaft gear that engages the input gear and is disposed on the second layshaft; and a braking mechanism for braking the input shaft by braking the second layshaft gear.

According to the configuration described above, synchronization between the rotational speed of the input shaft and the rotational speed of the transmission gear pair is possible even in an output reduction type transmission, because the rotational speed of the input shaft can be reduced by reducing the rotational speed of the second layshaft gear that engages the input gear fixedly attached to the input shaft by providing a second layshaft parallel to the input shaft, and a braking mechanism to the second layshaft. Because there is no further need to provide a mechanical synchromesh, gear operation can be lightened without increasing the size or costs.

According to one embodiment of the invention, the second layshaft is a reverse idle shaft fixed to a transmission case, the second layshaft gear is a reverse idle gear disposed rotatably on the reverse idle shaft, and the braking mechanism is provided to the reverse idle gear.

According to another embodiment of the invention, the second layshaft is a reverse idle shaft rotatably supported by the transmission case, the second layshaft gear is a reverse idle gear fixedly attached to the reverse idle shaft, and the braking mechanism is provided to the reverse idle shaft.

According to a further embodiment of the invention, the braking mechanism is a wet multiple disk clutch.

According to even another embodiment of the invention, the braking mechanism is a wet multiple disk clutch, clutch disks thereof on one side are provided to the second layshaft gear side, and clutch disks on the other side are provided to the second layshaft side.

According to another embodiment of the invention, the braking mechanism is a wet multiple disk clutch; the clutch center thereof, which is a piston of the wet multiple disk clutch, is connected to the second layshaft gear side; and the outer clutch, which is a cylinder of the wet multiple disk clutch, is connected to the second layshaft side.

According to one embodiment of the invention, the braking mechanism is a wet multiple disk clutch; clutch disks thereof on one side are provided to the second layshaft side; and clutch disks on the other side are provided to the transmission case side.

According to a further embodiment of the invention, the braking mechanism is a wet multiple disk clutch; the center clutch thereof, which is a piston of the wet multiple disk clutch, is connected to the second layshaft side; and the outer clutch, which is a cylinder of the wet multiple disk clutch, is connected to the transmission case side.

According to another embodiment of the invention, the braking mechanism is provided inside the transmission.

DESCRIPTION OF THE PREFERRED EMBODIMENTS

Preferred embodiments of the present invention are described below with reference to the accompanying drawings.

Figure 1:
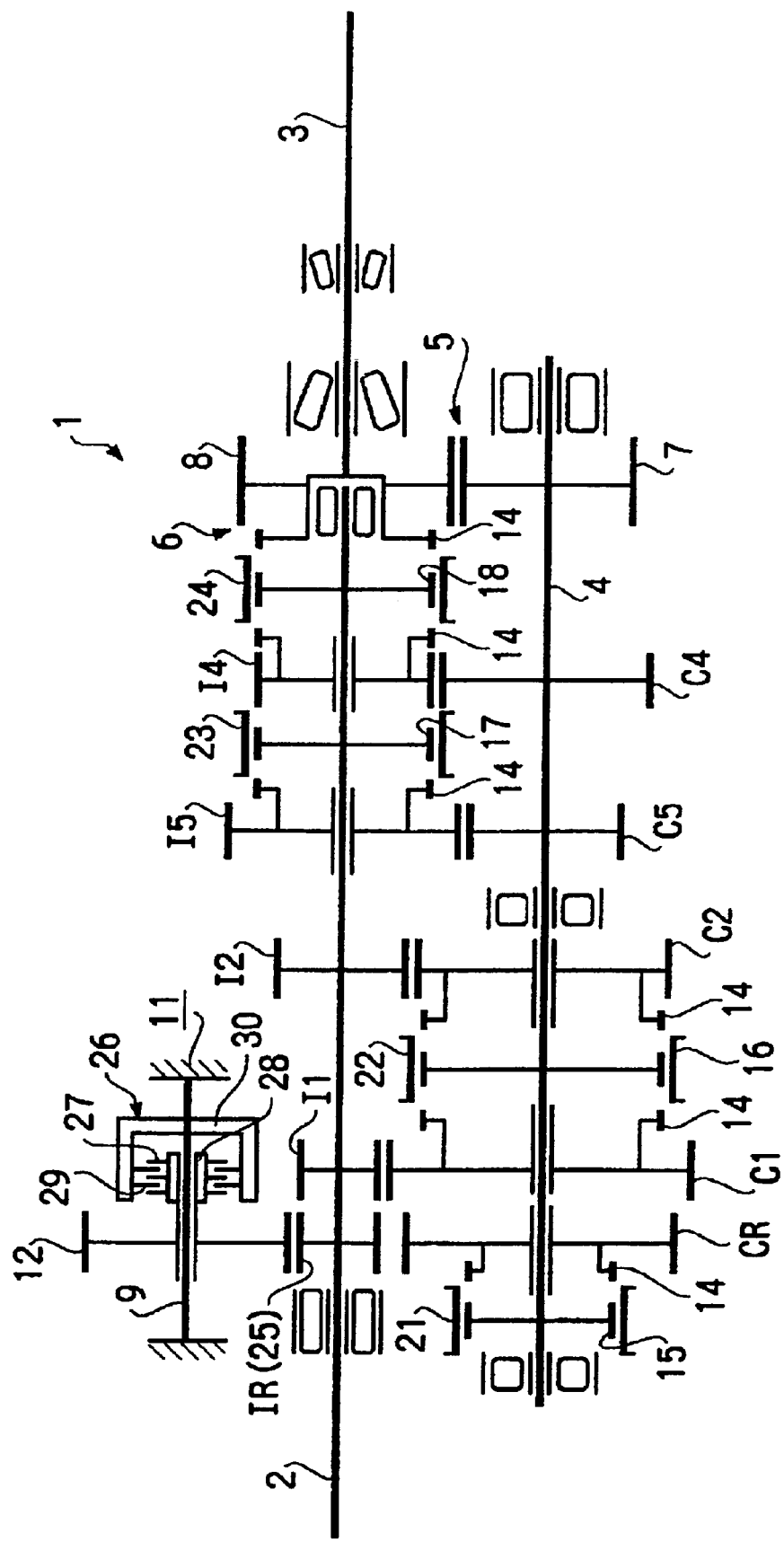
FIG. 1 is a structural diagram showing a preferred first embodiment of the transmission related to the present invention.

FIG. 1 is a structural diagram showing a preferred first embodiment of the transmission related to the present invention.

First, the configuration of the transmission related to the first embodiment is described. The transmission is of the output reduction type.

The transmission 1 comprises an input shaft 2 for inputting drive force from an engine, an output shaft 3 disposed concentrically with the input shaft 2 so as to be capable of relative rotation, and a first layshaft 4 disposed parallel to the input shaft 2 and the output shaft 3, as shown in FIG. 1. In the present embodiment, the first layshaft 4 is a countershaft.

A speed reduction gear 5 connected in a constant mesh fashion is disposed between the output shaft 3 and the first layshaft 4. The reduction gear 5 comprises a counter gear 7 fixedly attached (fixedly mounted) to the first layshaft 4, and an output shaft gear 8 fixedly attached (fixedly mounted) to the output shaft 3. Fixing in the present embodiment is performed by coupling the gears and the shafts with the aid of splines.

Gears IR, I1, and I2 are fixedly attached fixedly mounted) in sequence from the front (left side of the diagram) on the input shaft 2, and gears I5 and I4 are attached in a freely rotating manner. A lock-up clutch 6 composed of three speed gears is provided between the input shaft 2 and the output shaft 3.

Counter gears CR, C1, and C2 are attached in sequence from the front in a freely rotating manner to the first layshaft 4, and counter gears C5 and C4 are fixedly attached (fixedly mounted). These counter gears C1, C2, C5, and C4 are constantly engaged with the gears I1, I2, I5, and I4.

A reverse idle shaft constituting a second layshaft 9 is provided between the counter gear CR and the gear IR. The second layshaft 9 is fixed to the transmission case 11. A second layshaft gear (reverse idle gear) 12 is attached in a freely rotating manner to the second layshaft 9. The second layshaft gear 12 is constantly engaged with the counter gear CR and the gear IR.

Dog gears 14 are integrally provided to each of the counter gears CR, C1, and C2, the gears I5 and I4, and the lock-up clutch 6 so that the gears CR, C1, C2, I5, and I4, or the lock-up clutch 6 is selectable. First to fourth hubs 15 to 18 are fixedly attached (fixedly mounted) on the input shaft 2 and the first layshaft (countershaft) 4 adjacent to these dog gears 14. The first to fourth hubs 15 to 18 are fitted into first to fourth sleeves 21 to 24.

Splines are formed on the external peripheral portions of the dog gears 14 and the first to fourth hubs 15 to 18, and on the internal peripheral surface of the first to fourth sleeves 21 to 24; and the first to fourth sleeves 21 to 24 are constantly engaged with the first to fourth hubs 15 to 18 and simultaneously rotate with the input shaft 2 and the first layshaft 4, and also slide back and forth to selectively engage with and disengage from the dog gears 14. Gear changing is performed by these engagements and disengagements.

However, the present invention is characterized by comprising an input gear 25 (corresponding to the gear IR in the present embodiment) fixed to the input shaft 2, a second layshaft 9 disposed parallel to the input shaft 2, a second layshaft gear 12 that engages the input gear 25 and is disposed on the second layshaft 9, and a braking mechanism 26 for reducing the rotational speed of (braking) the input shaft 2 by reducing the rotational speed of (braking) the second layshaft gear 12. Synchronization of the rotational speed of the shafts 2 and 4, and the rotational speed of the gears C1, C2, I5, I4, and I3 of the transmission is ensured by this braking mechanism 26.

In the present embodiment, the second layshaft 9 is a reverse idle shaft fixed to the transmission case 11, the second layshaft gear 12 is a reverse idle gear disposed in a freely rotating manner on the reverse idle shaft 9, and the braking mechanism 26 is provided to the reverse idle gear 12.

The braking mechanism 26 is constituted by a wet multiple disk clutch, and is provided inside the transmission. The center clutch (comprising clutch disks 27 on one side) 28, which is the piston of the wet multiple disk clutch, is connected to the second layshaft gear 12 side; and the outer clutch (comprising clutch disks 29 on the other side) 30, which is the cylinder of the wet multiple disk clutch, is connected to the second layshaft 9 side.

The wet multiple disk clutch is operated by air pressure from an air tank (not depicted). When air pressure is supplied to the interior of the wet multiple disk clutch by the opening and closing of a solenoid valve (not depicted) provided between the air tank and the wet multiple disk clutch, the clutch disks 27 and 29 make contact with each other, bringing the brake into a state of operation. When the air pressure is released from within the wet multiple disk clutch by the opening and closing of the solenoid valve, the clutch disks 27 and 29 separate from each other, resulting in the brake entering a non-operating state.

The action of synchronizing the rotational speed of the shafts 2 and 4 and the rotational speed of the gears C1, C2, I5, I4, and I3 during gear shifting in the transmission based on the above-described configuration will now be described, accompanied by a description of the effect thereof.

Synchronization control by means of the braking mechanism 26 is performed in the case that the rotation of the dog gears is greater than the rotation of the sleeves, that is, during shifting up (increasing speed). When shifting down (reducing speed), double-clutch control is performed.

When shifting up from first gear to second gear, the second sleeve 22 engaged by the dog gears 14 of the counter gear C1 is released and brought to a neutral state, whereupon the rotational speed of the dog gears 14 of the counter gear C2 is reduced to the vicinity of the rotational speed of the second sleeve 22 to perform synchronization control by reducing the rotational speed of the second layshaft gear 12 in constant engagement with the input gear 25 of the input shaft 2 by means of the braking mechanism 26.

When shifting up from second gear to third gear, the second sleeve 22 engaged by the dog gears 14 of the counter gear C2 is released and brought to a neutral state, whereupon the rotational speed of the fourth sleeve 24 is reduced to the vicinity of the rotational speed of the dog gears 14 of the lock-up clutch 6 to perform synchronization control by reducing the rotational speed of the second layshaft gear 12 in constant engagement with the input gear 25 of the input shaft 2 by means of the braking mechanism 26.

When shifting up from third gear to fourth gear, the fourth sleeve 24 engaged by the dog gears 14 of the lock-up clutch 6 is released and brought to a neutral state, whereupon the rotational speed of the fourth sleeve 24 is reduced to the vicinity of the rotational speed of the dog gears 14 of the gear I4 to perform synchronization by reducing the rotational speed of the second layshaft gear 12 in constant engagement with the input gear 25 of the input shaft 2 by means of the braking mechanism 26.

When shifting up from fourth gear to fifth gear, the fourth sleeve 24 engaged by the dog gears 14 of the gear I4 is released and brought to a neutral state, whereupon the rotational speed of the third sleeve 23 is reduced to the vicinity of the rotational speed of the dog gears 14 of the gear I5 to perform synchronization by reducing the rotational speed of the second layshaft gear 12 in constant engagement with the input gear 25 with the input shaft 2 by means of the braking mechanism 26.

The action of each component described above is performed by way of air pressure, oil pressure, or other means, with the aid of an electrically connected control device (not depicted).

Thus, by providing a second layshaft 9 that constantly rotates the braking mechanism 26 simultaneously with the input gear 25 of the input shaft 2 so as to reduce the rotational speed of the input shaft 2 side, synchronization with the rotational speed of the transmission gear pair and the rotational speed of the input shaft can be performed even for a transmission of output reduction type.

Figure 4:
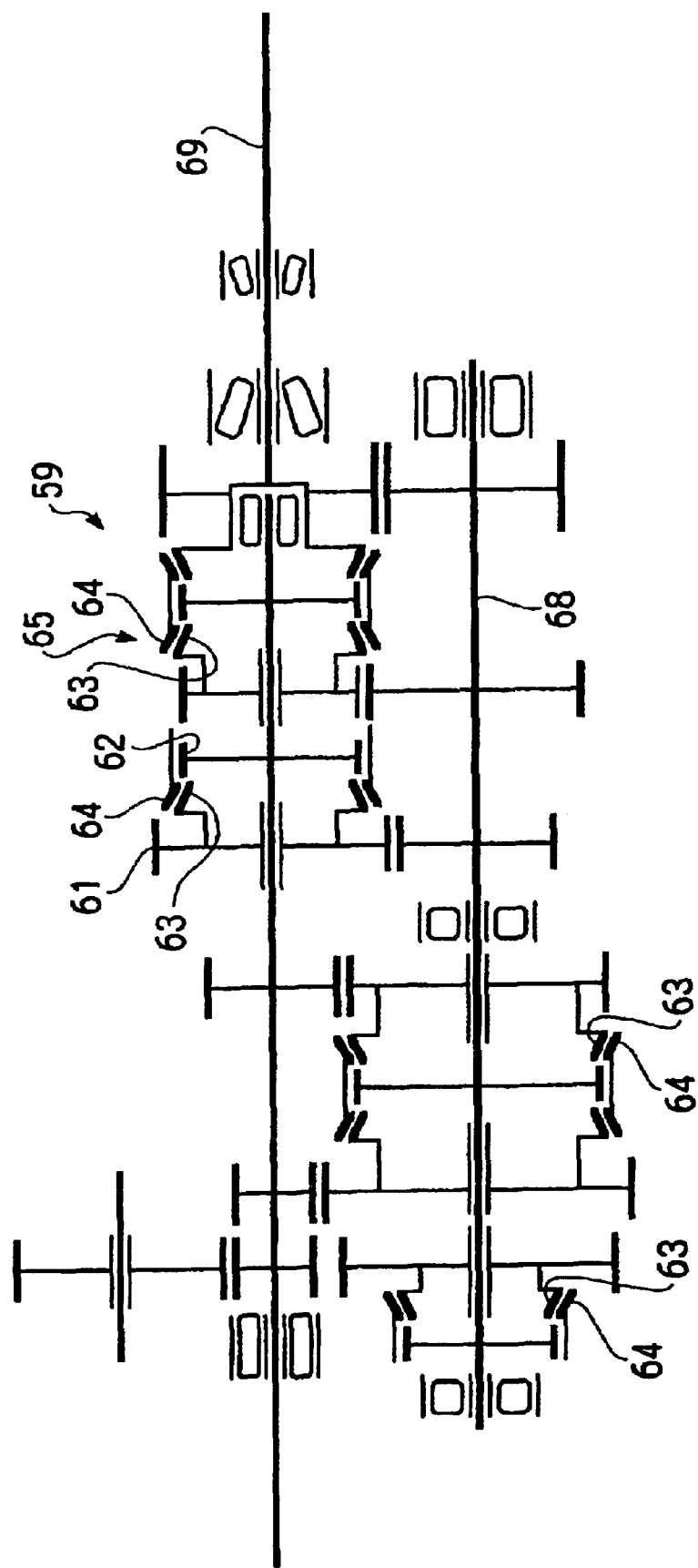
FIG. 4 is a structural diagram showing a transmission in which a conventional mechanical synchromesh is adopted.

There is no need to provide a mechanical synchromesh 65, as shown in FIG. 4, because synchronization is controlled by the braking mechanism 26, so gear operation can be lightened, without increasing the size of the transmission, and cost increase can be prevented because the number of components that require working can be reduced. The invention can also be applied to large vehicles because a mechanical synchromesh 65 is dispensed with.

Figure 2:
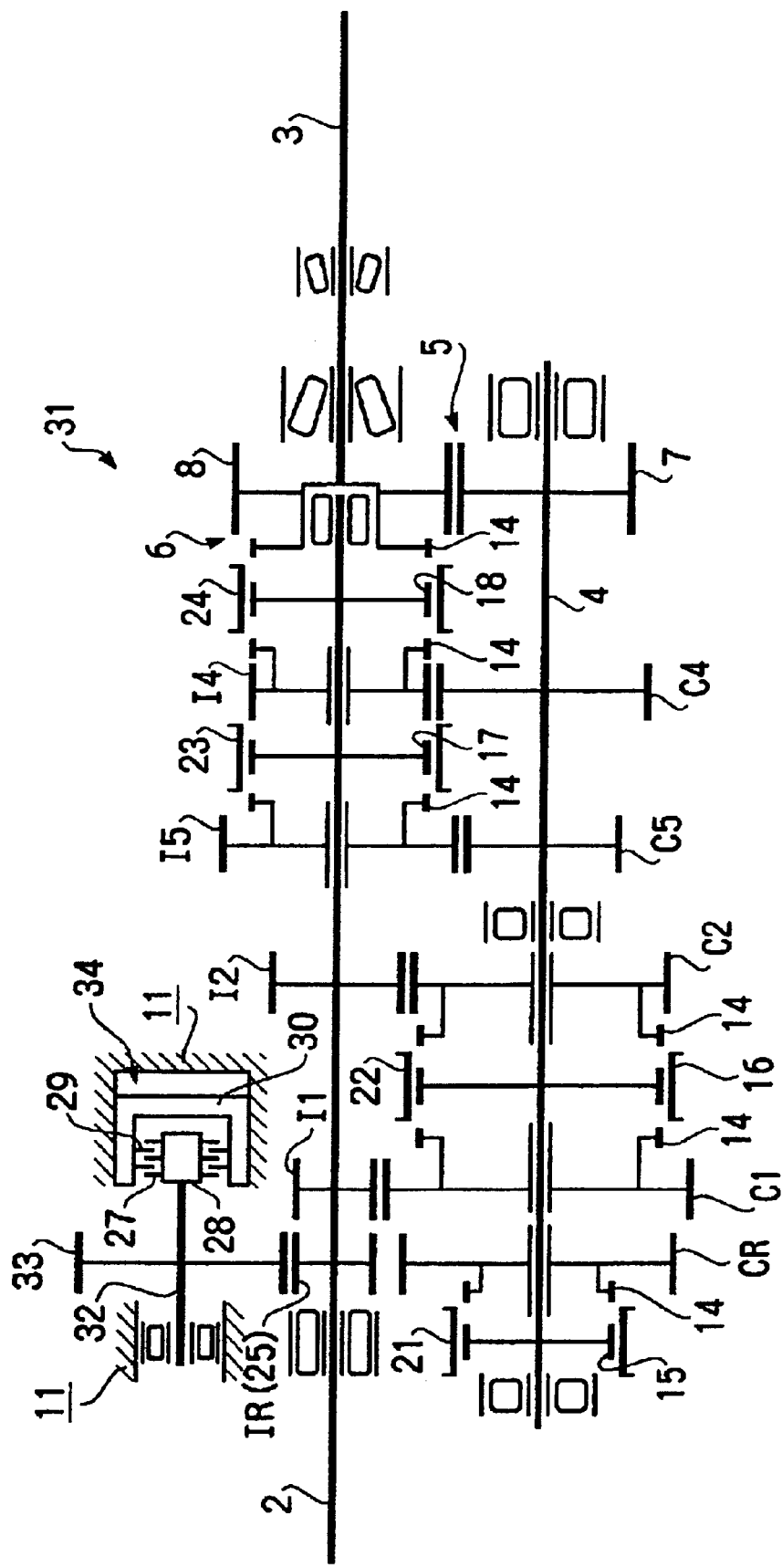
FIG. 2 is a structural diagram showing a preferred second embodiment of the transmission related to the present invention.
Figure 3:
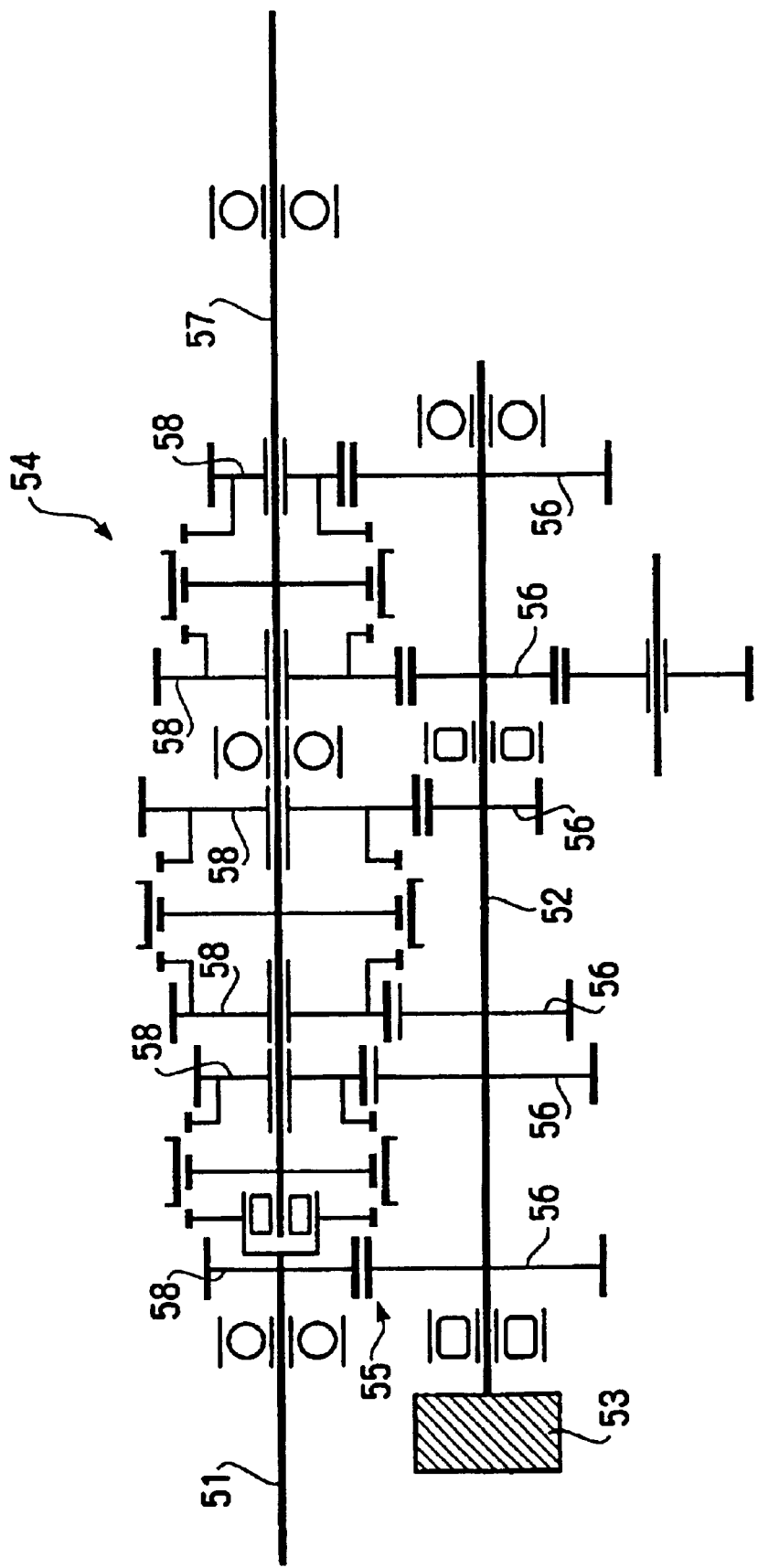
FIG. 3 is a structural diagram showing a conventional transmission.

FIG. 2 is a structural diagram showing a suitable second embodiment of the transmission related to the present invention.

The transmission 31 related to the second embodiment differs in comparison with the transmission 1 of FIG. 1 in that the attachment positions of the braking mechanism 34 and the supporting mechanism of the second layshaft. 32 are different.

More specifically, the second layshaft 32 comprises a reverse idle shaft rotatably supported by the transmission case 11, and the second layshaft gear 33 comprises a reverse idle shaft fixedly attached (fixedly mounted) to the second layshaft (reverse idle shaft) 32. The braking mechanism 34 is provided to the reverse idle shaft 32.

The braking mechanism 34 is constituted by a wet multiple disk clutch in the same manner as in FIG. 1, and is provided to the interior of the gear mechanism. The center clutch 28 (comprising clutch disks 27 on one side), which is the piston of the wet multiple disk clutch, is connected to the second layshaft gear 32 side; and the outer clutch 30 (comprising clutch disks 29 on the other side), which is the cylinder of the wet multiple disk clutch, is connected to the transmission case 11 side.

Other configurations are similar to the transmission of FIG. 1, so the same symbols have been applied and a description omitted.

In the transmission 31 of the present embodiment, synchronization control is achieved with the aid of the braking mechanism 34 by reducing the rotational speed of the second layshaft 32 that rotates simultaneously with the second layshaft gear 33 in constant engagement with the input gear 25 of the input shaft 2, and the same effect as that of the transmission 1 of FIG. 1 can be obtained.

In the embodiment described above, braking mechanisms 26 and 34 are provided to the reverse idle shafts 9 and 32, or to the revere idle gears 12 and 33, but the second layshaft and second layshaft gear may be separately provided and a braking mechanism may be provided thereto.

The braking mechanism is not limited to a wet multiple disk clutch, and other mechanisms may be used as long as the rotational speed of the input shaft 2 is reduced.

What is claimed is:

1. A transmission comprising:
   an input shaft for inputting drive force from an engine;
   an output shaft disposed substantially concentrically with the input shaft so as to be capable of relative rotation with respect to the input shaft;
   a first layshaft disposed substantially parallel to the input shaft and the output shaft;
   a speed reduction gear connected between the output shaft and the first layshaft in a constant-mesh manner; and
   a plurality of transmission gear pairs provided between the input shaft and the first layshaft or output shaft to mutually engage and to transmit the rotational force of the input shaft to the output shaft,
   wherein said transmission further comprises:
   an input gear fixedly attached to the input shaft;
   a second layshaft disposed substantially parallel to the input shaft;
   a second layshaft gear that engages the input gear and is disposed on the second layshaft; and
   a braking mechanism for braking the input shaft by braking the second layshaft gear,
   wherein the second layshaft is a reverse idle shaft fixed to a transmission case, the second layshaft gear is a reverse idle gear disposed rotatably on the reverse idle shaft, and the braking mechanism is provided to the reverse idle gear.

2. The transmission according to claim 1, wherein the braking mechanism is a wet multiple disk clutch.

3. The transmission according to claim 2, wherein the braking mechanism is provided inside the transmission.

4. The transmission according to claim 1, wherein the braking mechanism is a wet multiple disk clutch, clutch disks thereof on one side are provided to the second layshaft gear side, and clutch disks on the side are provided to the second layshaft side.

5. The transmission according to claim 4, wherein the braking mechanism is provided inside the transmission.

6. The transmission according to claim 1, wherein the braking mechanism is a wet multiple disk clutch; the clutch center thereof, which is a piston of the wet multiple disk clutch, is connected to the second layshaft gear side; and the outer clutch, which is a cylinder of the wet multiple disk clutch, is connected to the second layshaft side.

7. The transmission according to claim 6, wherein the braking mechanism is provided inside the transmission.

8. The transmission according to claim 1, wherein the braking mechanism is provided inside the transmission.

9. A transmission comprising:

an input shaft for inputting drive force from an engine;

an output shaft disposed substantially concentrically with the input shaft so as to be capable of relative rotation with respect to the input shaft;

a first layshaft disposed substantially parallel to the input shaft and the output shaft:

a speed reduction gear connected between the output shaft and the first layshaft in a constant-mesh manner; and a plurality of transmission gear pairs provided between the input shaft and the first layshaft or output shaft to mutually engage and to transmit the rotational force of the input shaft to the output shaft, wherein said transmission further comprises:

an input gear fixedly attached to the input shaft;

a second layshaft disposed substantially parallel to the input shaft;

a second layshaft gear that engages the input gear and is disposed on the second layshaft; and a braking mechanism for braking the input shaft by braking the second layshaft gear, wherein the second layshaft is a reverse idle shaft rotatably supported by the transmission case, the second layshaft gear is a reverse idle gear fixedly attached to the reverse idle shaft, and the braking mechanism is provided to the reverse idle shaft.

10. The transmission according to claim 9, wherein the braking mechanism is a wet multiple disk clutch; clutch disks thereof on one side are provided to the second layshaft side; and clutch disks on the other side are provided to the transmission case side.

11. The transmission according to claim 10, wherein the braking mechanism is provided inside the transmission.

12. The transmission according to claim 9, wherein the braking mechanism is a wet multiple disk clutch; the center clutch thereof, which is a piston of the wet multiple disk clutch, is connected to the second layshaft side; and the outer clutch, which is a cylinder of the wet multiple disk clutch, is connected to the transmission case side.

13. The transmission according to claim 12, wherein the braking mechanism is provided inside the transmission.

14. The transmission according to claim 9, wherein the braking mechanism is a wet multiple disk clutch.

15. The transmission according to claim 9, wherein the braking mechanism is provided inside the transmission.

* * * * *